United States Patent
Park et al.

(10) Patent No.: US 8,675,692 B2
(45) Date of Patent: Mar. 18, 2014

(54) METHOD FOR ACQUIRING PROCESSING TIME OF WIRELESS SIGNAL

(75) Inventors: Jisoo Park, Daejeon (KR); Sook Jin Lee, Daejeon (KR); Namsuk Lee, Daejeon (KR); Geon Min Yeo, Daejeon (KR); Kanghee Kim, Daejeon (KR); Sun-Mi Jun, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 715 days.

(21) Appl. No.: 12/908,337

(22) Filed: Oct. 20, 2010

(65) Prior Publication Data

US 2011/0090810 A1   Apr. 21, 2011

(30) Foreign Application Priority Data

Oct. 20, 2009  (KR) .................. 10-2009-0099768
Oct. 20, 2010  (KR) .................. 10-2010-0102346

(51) Int. Cl.
*H04W 72/04* (2009.01)
(52) U.S. Cl.
USPC ........................................... 370/522
(58) Field of Classification Search
USPC ........................................... 370/522
See application file for complete search history.

(56) References Cited

U.S. PATENT DOCUMENTS

| | | | |
|---|---|---|---|
| 2010/0254275 A1 | 10/2010 | Kang et al. | |
| 2011/0134757 A1* | 6/2011 | Lin et al. | 370/241 |
| 2012/0039294 A1* | 2/2012 | Yan et al. | 370/329 |
| 2013/0132786 A1* | 5/2013 | Tanigawa et al. | 714/749 |

FOREIGN PATENT DOCUMENTS

KR   10-2009-0030760   3/2009

OTHER PUBLICATIONS

U.S. Appl. No. 61/180634, filed May 22, 2009.*

* cited by examiner

*Primary Examiner* — Melvin Marcelo
(74) *Attorney, Agent, or Firm* — Staas & Halsey LLP (57) ABSTRACT

A base station resets a wireless signal processing time depending on the processing capability of a terminal, and determines the transmission position of a feedback signal for a data packet using the reset wireless signal processing time and transmits the same to the terminal. If the feedback signal indicates the success of reception of the data packet, the data packet can be processed using the reset wireless signal processing time, and the wireless signal processing time can be reset to a smaller value.

17 Claims, 5 Drawing Sheets

METHOD FOR ACQUIRING PROCESSING TIME OF WIRELESS SIGNAL

CROSS-REFERENCE TO RELATED APPLICATION

This application claims priority to and the benefit of Korean Patent Application No. 10-2009-0099768 and 10-2010-0102346 filed in the Korean Intellectual Property Office on Oct. 20, 2009 and Oct. 20, 2010, the entire contents of which are incorporated herein by reference.

BACKGROUND OF THE INVENTION (a) Field of the Invention

The present invention relates to a method for acquiring the processing time of a wireless signal.

(b) Description of the Related Art

Uplink and downlink transmission and reception methods in a wireless environment are classified into a Frequency Division Duplex (hereinafter, referred to as "FDD") scheme where uplink and downlink transmissions occur on different frequencies and a Time Division Duplex (hereinafter, referred to as "TDD") where uplink and downlink transmissions occur at different times. The HSDPA (High Speed Downlink Packet Access) standard for FDD and TDD uses protocols, such as Hybrid Automatic Repeat Request (hereinafter, referred to as "HARQ").

The HARQ scheme is divided into a synchronous HARQ scheme and an asynchronous HARQ scheme depending on a data packet retransmission time point. The synchronous HARQ is a scheme in which data is retransmitted at a time point known to a transmitter and a receiver. The asynchronous HARQ is a scheme in which a transmitter, e.g., a base station scheduler determines the retransmission time point of a retransmission data packet to retransmit the data packet.

Moreover, the HARQ may be divided into adaptive HARQ and may be classified into an adaptive HARQ and a non-adaptive HARQ according to transmission attributes such as a resource allocation, modulation scheme, size of a transport block, and the like. The adaptive HARQ is a scheme in which the transmission attributes used for retransmission are entirely or partially changed and transmitted according to a change in a channel state. The non-adaptive HARQ is a scheme in which the transmission attributes used for an initial transmission are continuously used regardless of a change in the channel state.

To reduce signaling overhead caused by a control signal, such as resource allocation information, it is effective to use a non-adaptive synchronous HARQ scheme in which a retransmission time point and the transmission attributes are not changed.

But, it may be effective to use an adaptive asynchronous HARQ scheme with a scheduling gain if signaling overhead is not taken into account.

According to the HARQ scheme, a receiver checks whether an error is detected by decoding a data packet received by a physical layer, and, if no error is detected, transmits an Acknowledgment (ACK) signal as a feedback signal to inform a transmitter about the successful reception of the data packet. However, if an error is detected in the received data packet, the receiver transmits a Negative Acknowledgment (NACK) signal as a feedback signal to inform the transmitter about the detection of an error in the data packet. Upon receiving the NACK signal, the transmitter may retransmit the data packet. At this point, if the receiver is a base station and the transmitter is a terminal, the terminal is allocated uplink transmission resources via a downlink control signal by using the allocated transmission resources.

In general, a wireless communication system uses a fixed transmission time point at the time of transmission and reception of a data packet and a control signal between a base station and a terminal, between base stations, or between terminals. This assumes that data transmission processing capability is the same for both a base station and a terminal. However, with the development of system technology and memory technology, data processing capability varies between a base station and a terminal, between terminals, and between base stations. For example, the data processing capability of terminal A may be more excellent than that of terminal B. In this way, a method of using a fixed transmission time point in a wireless communication system where a higher transmission rate can be satisfied may degrade transmission quality.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for acquiring the processing time of a wireless transmission signal which can improve transmission performance.

An exemplary embodiment of the present invention provides a method for acquiring a wireless signal processing time of a terminal in a base station, the method comprising: sending a request for the wireless signal processing time to the terminal; receiving the wireless signal processing time from the terminal; determining the transmission position of a feedback signal for a data packet using the wireless signal processing time; and transmitting the transmission position of a feedback signal to the terminal.

Another exemplary embodiment of the present invention provides a method for acquiring a wireless signal processing time of a terminal in a base station, the method including: setting the wireless signal processing time to a first value; when transmitting a downlink packet to the terminal, determining the transmission position of a feedback signal of the downlink packet using the first value and transmitting the same to the terminal; receiving, from the terminal, the feedback signal for the downlink packet transmitted at the above transmission position; resetting the wireless signal processing time to a second value different from the first value; and if there is a downlink packet to be transmitted to the terminal, determining the transmission position of the feedback signal using the second value and transmitting the same to the terminal.

Still another exemplary embodiment of the present invention provides a method for acquiring a wireless signal processing of a terminal time in a base station, the method including:

if there is an uplink packet to be transmitted to the base station from the terminal, receiving a resource allocation request message from the terminal; allocating resources for the uplink packet using a wireless signal processing time having a first value, determining the transmission position of a feedback signal for the uplink packet, and transmitting the same to the terminal; receiving, from the terminal, the uplink packet transmitted using the above resources; transmitting the feedback signal at the transmission position to the terminal; resetting the wireless signal processing time to a second value different from the first value; and if a resource allocation request message is received from the terminal, allocating the resources using the second value and determining the transmission position of the feedback signal and transmitting the same to the terminal.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a terminal (UE) may designate a mobile station (MS), a mobile terminal (MT), a subscriber station (SS), a portable subscriber station (PSS), user equipment (UE), an access terminal (AT), etc., and may include the entire or partial functions of the mobile terminal, the subscriber station, the portable subscriber station, the user equipment, etc.

In this specification, a base station (BS) may designate a radio access station (RAS), a Node B, an evolved node B (eNodeB), a base transceiver station (BTS), a mobile multi-hop relay (MMR)-BS, etc., and may include the entire or partial functions of the base station, the radio access station, the node B, the base transceiver station, the MMR-BS, etc.

Now, a method for acquiring the processing time of a wireless transmission signal according to an exemplary embodiment of the present invention will be described in detail with reference to the accompanying drawings. It is assumed that, in the exemplary embodiment of the present invention a wireless transmission signal is transmitted by a Hybrid Automatic Repeat Request (hereinafter, referred to as "HARQ") scheme in a wireless communication system. Here, the wireless transmission signal may include an HARQ packet and a control signal. The HARQ packet may be a downlink packet or an uplink packet. The processing time of a wireless transmission signal denotes the time taken for a receiving side to detect the last transmission signal of a transmitting side and completes the transmission of a feedback signal for the wireless transmission signal to the transmitting side. That is, in the case that the HARQ packet is a downlink packet, the processing time of a wireless transmission signal of a terminal can be defined as the time taken for a terminal to receive and decode an encoded downlink packet transmitted from a base station, detect the presence or absence of an error, and then complete the transmission of a feedback signal indicative of the success or failure of reception of the downlink packet to the base station. In the case that the HARQ packet is an uplink packet, the processing time of a wireless transmission signal of a terminal can be defined as the time taken for a terminal to receive a downlink control signal from a base station for uplink packet transmission and to complete the transmission of an uplink packet to the base station using uplink transmission resources included in an uplink control signal. Also, the processing time of a wireless transmission signal of a base station can be defined as the time for the base station to receive and decode an uplink packet, detect the presences or absence of an error, and then complete the transmission of a feedback signal indicative of the success or failure of reception of the uplink packet to the terminal.

Figure 1:
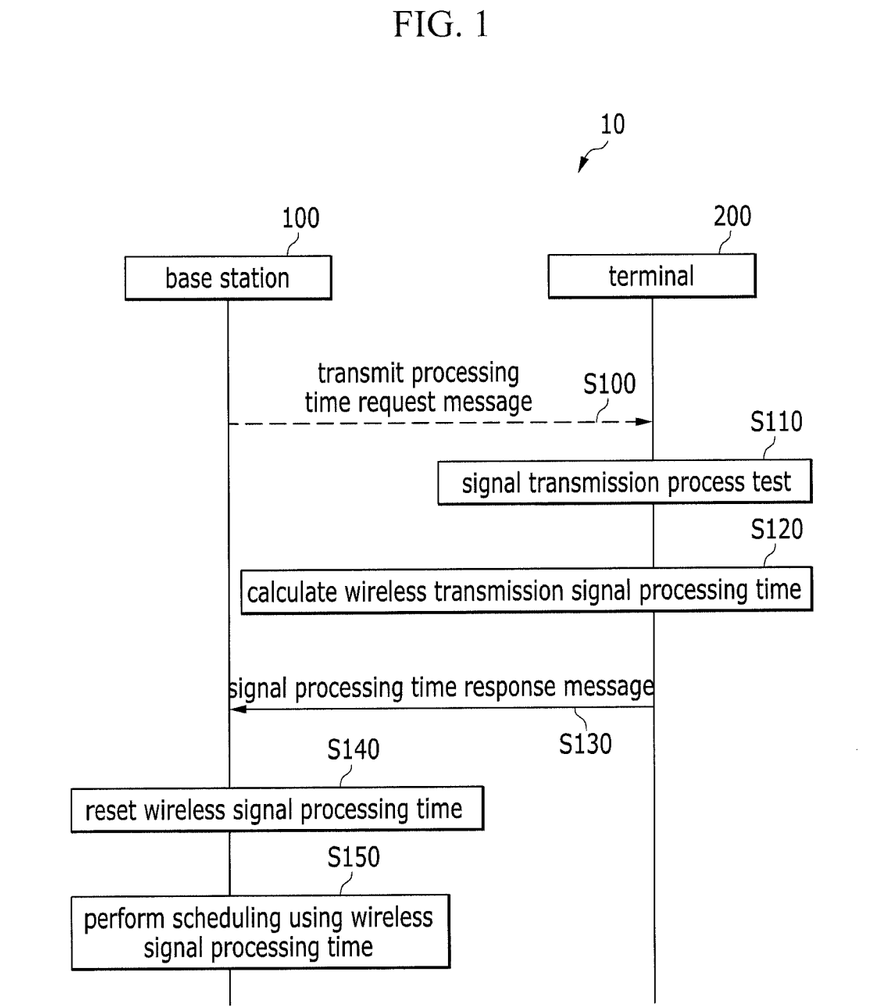
FIG. 1 is a view showing a method for acquiring the processing time of a wireless transmission signal of a terminal according to a first exemplary embodiment of the present invention.

FIG. 1 is a view showing a method for acquiring the processing time of a wireless transmission signal of a terminal according to a first exemplary embodiment of the present invention.

As shown in FIG. 1, a wireless access system 10 in a wireless environment according to an exemplary embodiment of the present invention comprises a base station 100 and a terminal 200.

The base station 100 transmits a signal processing time request message to the terminal 200 in order to acquire the processing time (hereinafter, referred to as "wireless signal processing time") of a wireless transmission signal (S100). While the base station 100 according to the exemplary embodiment of the present invention transmits a signal processing time request message to the terminal 200 in order to acquire the processing time of a wireless signal, the present invention is not limited thereto. For example, the terminal 200 informs the base station 200 of its basic capability by receiving a SBC-REQ (SS Basic Capability Request) message from the base station 200 and transmitting an SBC-RSP (SS Basic Capability Response) message to the base station 200. At this time, a wireless signal processing time may be contained in the SBC-RSP message.

The terminal 200 performs a signal transmission process test upon receiving the signal processing time request message from the base station 100 (S110). Then, the terminal 200 calculates the wireless signal processing time, and creates a signal processing time response message containing the calculated wireless signal processing time and transmits to the base station 100 (S120 and S130).

The base station 100 detects the wireless signal processing time from the signal processing time response message transmitted from the terminal 200. The base station 100 decides whether to reset the wireless signal processing time, and, if it is decided that resetting is needed, resets the wireless signal processing time (S140). The base station 100 performs packet scheduling by using the wireless signal processing time acquired from the terminal 200 (S150).

For example, in the case that there is a downlink packet to be transmitted to the terminal 200 from the base station 100, the base station 100 determines the priority of transmission based on the wireless signal processing time of the terminal 200 so as to satisfy the service quality and transmission speed required by the terminal 200, and transmits the downlink packet and a downlink control signal to the terminal 100 according to the determined priority. Moreover, the base station 100 determines the transmission time point, i.e., transmission position of a feedback signal for the downlink packet to be transmitted by the terminal 200 and allocates resources for the feedback signal by using the wireless signal processing time acquired from the terminal 200. Then, the base station 100 transmits the downlink packet and the downlink control signal to the terminal 100. The downlink control signal contains the transmission position of a feedback signal. The terminal 200 receives the downlink packet and then transmits, to the base station 200, a signal indicative of the success or failure of reception of the downlink packet as a feedback signal. At this point, if the terminal 200 detects an error by decoding the downlink packet, it may transmit an acknowledgement (ACK) signal as a feedback signal to the base station 100. If the terminal 200 detects an error from the downlink packet, it may transmit a negative-acknowledgement (NACK) signal as a response signal to the base station 100

Upon receiving the NACK signal as a feedback signal, the base station 100 retransmits the downlink packet. In the case that there is an uplink packet to be transmitted to the base station 100, the base station 100 allocates resources for the uplink packet based on the wireless signal processing time so as to satisfy the service quality and transmission speed required by the terminal 200, determines the transmission position of a feedback signal for the uplink packet, and includes resource allocation information and the transmission position of the feedback signal in a downlink control signal and transmits it to the terminal 100. Then, the terminal 200 transmits the uplink packet to the base station 100 using the allocated resources, and the base station 100 receives them and transmits a feedback signal for the uplink packet from the corresponding transmission position to the terminal 200. As such, the method for acquiring the wireless signal processing time of the terminal 200 according to the first exemplary embodiment of the present invention is an explicit acquisition method in which the terminal 100 provides a wireless signal processing time to the base station 100. In the explicit acquisition method, while the base station 100 may send a request for the wireless signal processing time to the terminal 200 as shown in FIG. 1, it may be also possible that, in the case of sending a request for resources for uplink packet transmission, the terminal 200 may provide a wireless signal processing time to the base station 100 by including the wireless signal processing time in the corresponding resource request signal. Next, a method for acquiring the wireless signal processing time of the terminal 200 if the wireless signal processing time of the terminal 200 can be acquired by the above explicit acquisition method will be described with reference to FIGS. 2 and 3.

Figure 2:
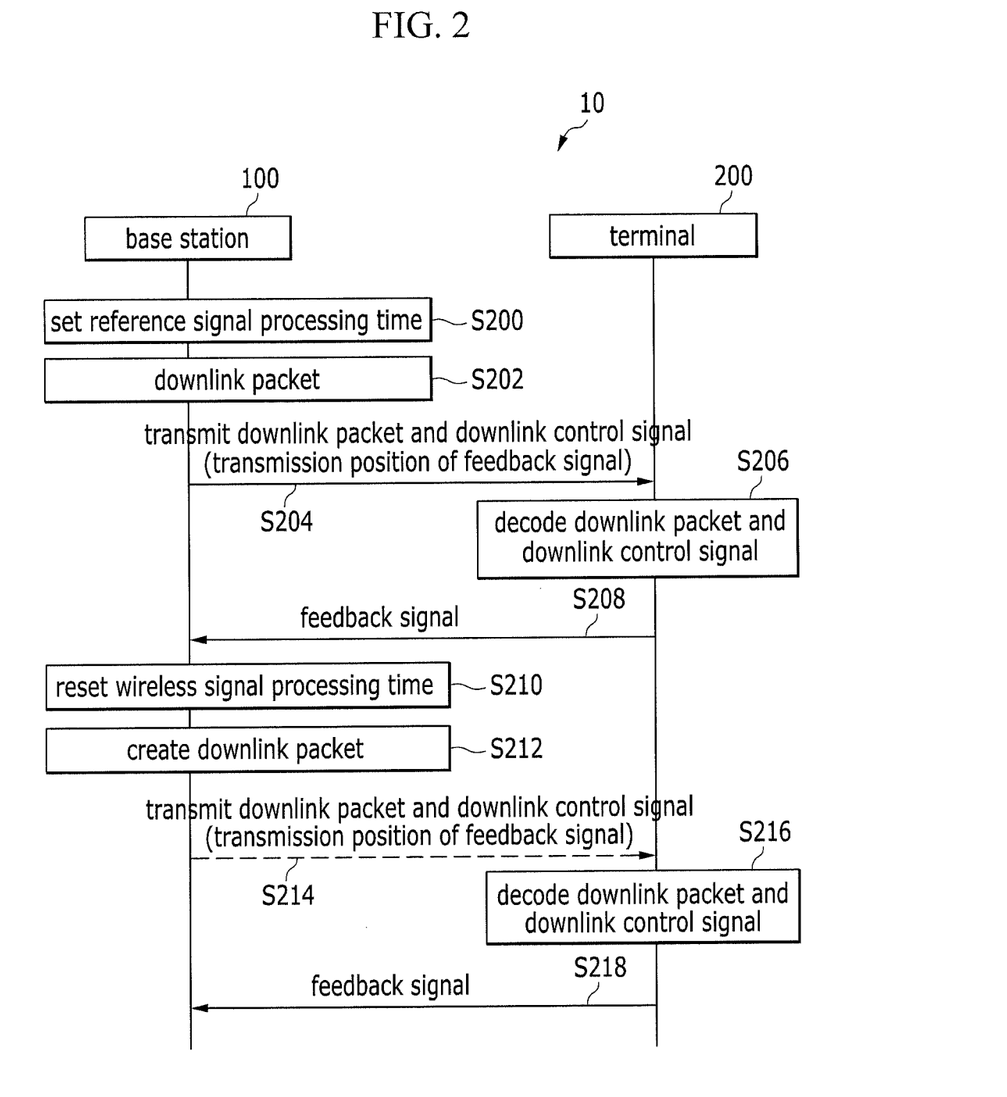
FIG. 2 is a view showing a method for acquiring the wireless signal processing time of a terminal according to a second exemplary embodiment of the present invention.

FIG. 2 is a view showing a method for acquiring the wireless signal processing time of a terminal according to a second exemplary embodiment of the present invention.

As shown in FIG. 2, the base station 100 sets a reference signal processing time (S200). If a reference signal processing time is not defined in advance, the base station 100 can set a certain period of time as the reference signal processing time. The reference signal processing time according to the exemplary embodiment of the present invention is a value arbitrarily set by a user in order to decide whether to reset the wireless signal processing time.

If there is a downlink packet to be transmitted to the terminal 200 from the base station 100 (S202), resources for the transmission position of a feedback signal are allocated so as to receive a feedback signal for the downlink packet from the terminal 200 after the reference signal processing time. Then, the base station 100 includes the transmission position of the feedback signal in a downlink control signal, and transmits it, along with the downlink packet, to the terminal 200 (S204). The terminal 200 receives the downlink packet (S206), and transmits a feedback signal for the downlink packet from the corresponding transmission position to the base station 100 (S208). At this point, when an ACK signal indicative of the success of reception is received as the feedback signal, the base station 100 can set the wireless signal processing time as the reference signal processing time. Moreover, when the feedback signal is received (S210), the base station 100 can reset the wireless signal processing time of the terminal 100 to a value different from the reference signal processing time depending on the processing capability or transmission service quality of the terminal 100 (S212). For example, when an ACK signal is received as the feedback signal, the base station 100 may perform a procedure for resetting the wireless signal processing time of the terminal 100 because the processing capability of the terminal 100 may be higher than the reference signal processing time.

Specifically, the base station 100 resets the wireless signal processing time to a value smaller than the reference signal processing time, and determines the transmission position of the feedback signal using the reset wireless signal processing time. Then, the base station 100 transmits a downlink control signal containing the transmission position of the feedback signal, along with the downlink packet, to the terminal 200 in the same manner as the above-described method (S214). The terminal 200 receives the downlink packet, and transmits a feedback signal for the downlink packet from the corresponding transmission position to the base station 100. When an ACK signal indicative of the success of reception is received as the feedback signal from the terminal 200, the base station 100 can process the downlink packet based on the reset wireless signal processing time. At this point, the wireless signal processing time of the terminal 200 can be reduced depending on the processing capability of the terminal 200 by repeating the above steps. Meanwhile, in the step S210, if an NACK signal is received, the base station 100 determines that the processing capability of the terminal 200 is lower than the reference signal processing time, and the base station 100 can perform the procedure for resetting the wireless signal processing time. Specifically, the base station 100 resets the wireless signal processing time of the terminal 200 to a value greater than the reference signal processing time, determines the transmission position of a feedback signal in the same manner as the above-described method by using the reset wireless signal processing time. As such, the base station 100 is able to reset the wireless signal processing time depending on the processing capability of the terminal 200, and provide the transmission positions of various feedback signals to each terminal using the reset wireless signal processing time, thereby enabling efficient scheduling of wireless resources.

Meanwhile, when the base station 100 does not reset wireless signal processing time of the terminal 200, does not include the transmission position of the feedback signal in the downlink control signal.

Figure 3:
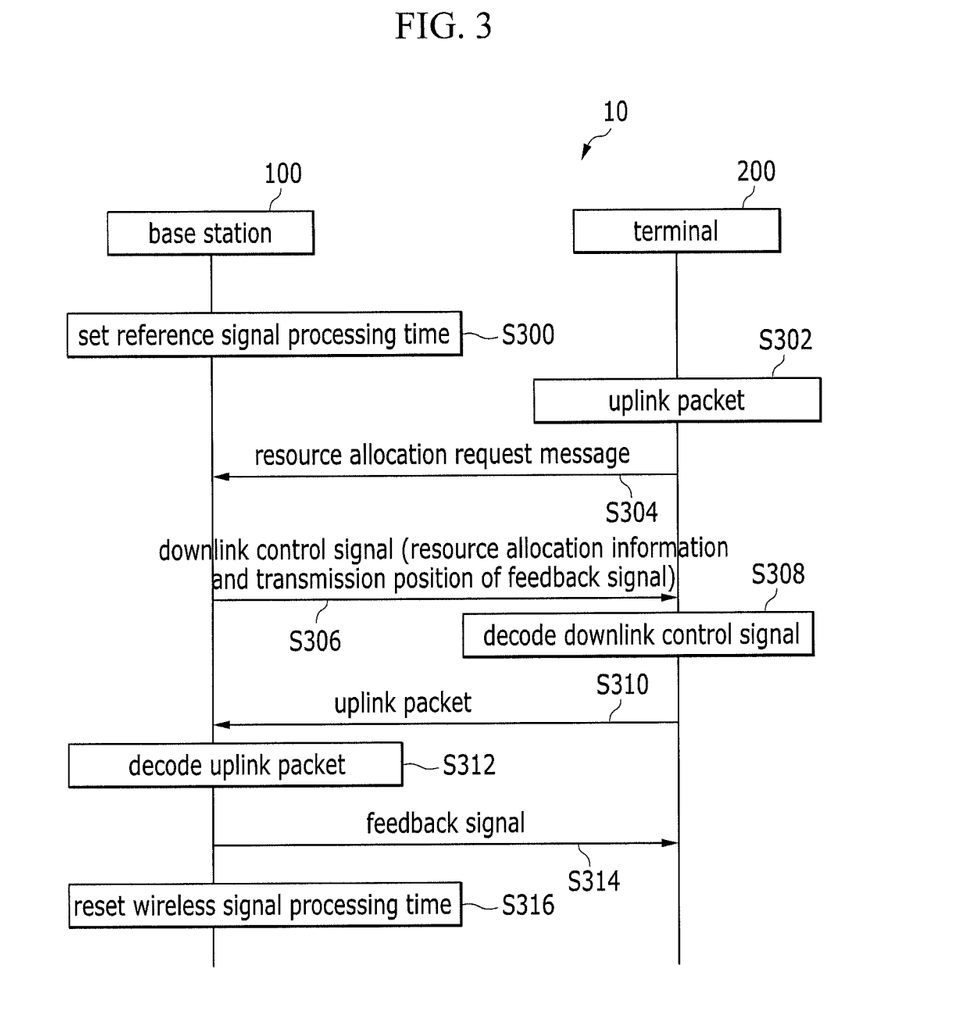
FIG. 3 is a view showing a method for acquiring the wireless signal processing time of a terminal according to a third exemplary embodiment of the present invention.

FIG. 3 is a view showing a method for acquiring the wireless signal processing time of a terminal according to a third exemplary embodiment of the present invention.

As shown in FIG. 3, a base station 100 sets a reference signal processing time (S300).

If there exits an uplink packet to be transmitted from a terminal 200 to the base station 100, the terminal 200 transmits a resource allocation request message to the base station 100 (S304). The base station 100 allocates resources for the uplink packet using the reference signal processing time, includes resource allocation information and the transmission position of a feedback signal for the uplink packet in a downlink control signal, decodes the downlink control signal, and transmits it to the terminal 200 (S306).

The terminal 200 receives a downlink control signal, and decodes the received downlink control signal (S308).

Then, the terminal 200 transmits the uplink packet to the base station 100 using the resources allocated from the decoded downlink control signal (S310).

The base station 100 receives the uplink packet, decodes the uplink packet, and transmits a feedback signal for the downlink packet from the corresponding transmission position to the terminal (S312). At this point, the base station 100 transmits an ACK signal indicative of the success of reception as the feedback signal, and then can reset the wireless signal processing time of the terminal 100 to a value different from the reference signal processing time depending on the processing capability or transmission service quality of the terminal 100 (S314).

If it is determined that it is necessary to reset the wireless signal processing time to be shorter than the reference processing time, the base station 100 resets the wireless signal processing time to a value smaller than the reference processing time. If it is determined that it is necessary to reset the wireless signal processing time to be longer than the reference processing time, the base station 100 resets the wireless signal processing time to a value greater than the reference processing time. Then, the steps can be repeated based on the reset wireless signal processing time.

Figure 4:
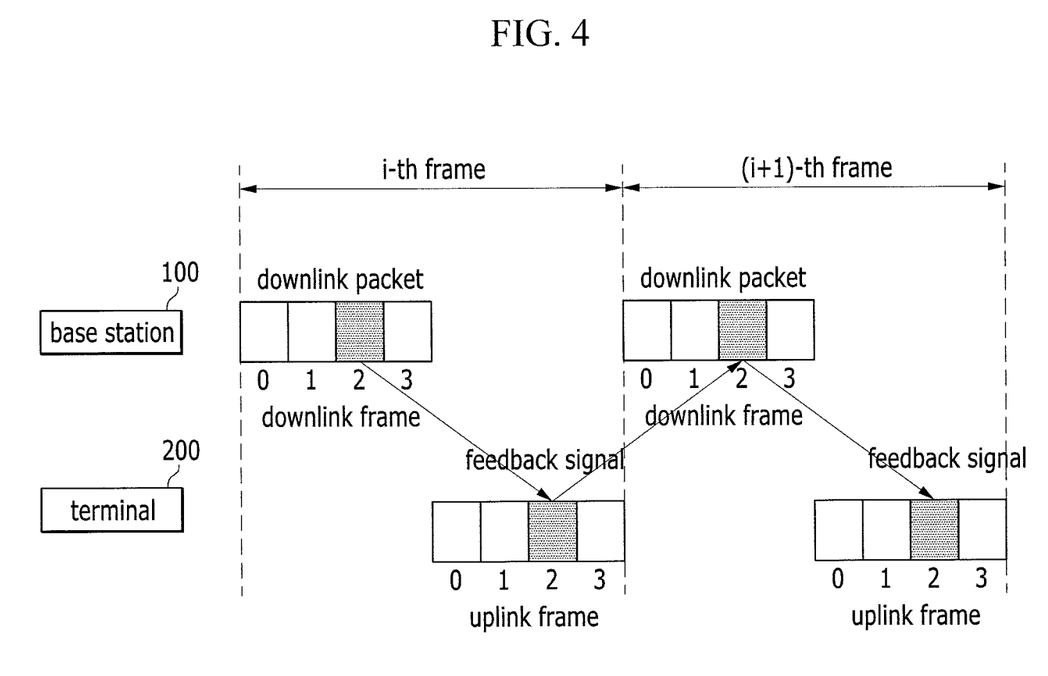
FIG. 4 is a view showing one example of an operation procedure of a general downlink packet HARQ transmission process.
Figure 5:
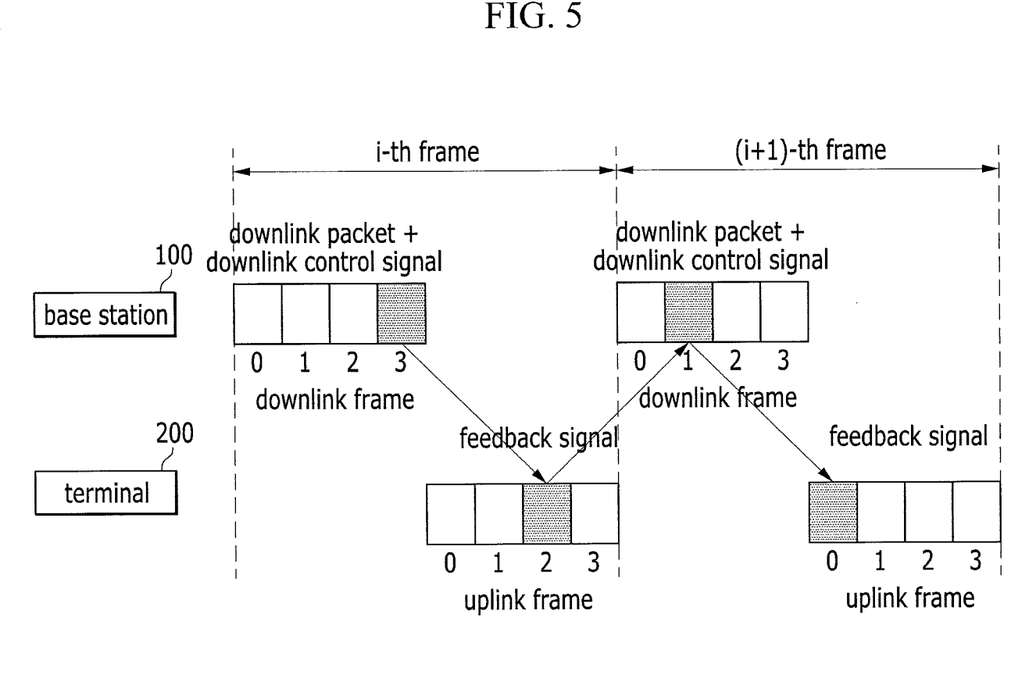
FIG. 5 is a view showing one example of an HARQ transmission operation of a downlink packet according to an exemplary embodiment of the present invention.

Referring to FIGS. 4 and 5, a transmission scheme for acquiring the processing time of a wireless signal according to an exemplary embodiment of the present invention will be described in detail. It is assumed, in FIGS. 4 and 5, that the allocation and occupation of resources are done in units of slots or subframes, one slot includes one wireless signal processing time, i.e., a TTI (transmission time interval) unit, an uplink frame and a down link frame each include four slots, and the reference signal processing time of a base station and a terminal is 3 TTI. Here, the TTI is the duration of the transmission of the physical layer for a packet encoded over a radio air interface, and is expressed as an integer number of subframes.

FIG. 4 is a view showing one example of an operation procedure of a general downlink packet HARQ transmission process.

Referring to FIG. 4, the base station 100 transmits a downlink packet to the terminal 200 in an HARQ transmission scheme by using a uniform and fixed wireless signal processing time without acquiring a wireless signal processing time.

Specifically, after the base station 100 completes the transmission of the encoded downlink packet from the index position of slot No. 2 of the i-th downlink frame, the terminal 200 receives the downlink packet, decodes it to detect the presence or absence of an error, and then encodes a feedback signal. Since the fixed wireless signal processing time is 3 TTIs, the terminal 200 encodes and transmits a feedback signal for the downlink packet to the index of slot No. 2 of the (i+1)-th DL frame after 3 slot TTIs from the index point of slot No. 2 of the i-th UL frame.

The base station 100 decodes the feedback signal, decides whether the feedback signal is an ACK signal, and determines whether to retransmit the downlink packet. If it is necessary to retransmit the downlink packet, resources for the transmission of the downlink packet are allocated using the fixed wireless signal processing time (3 TTIs). Otherwise, if it is not necessary to retransmit the downlink packet, resources for the transmission of a new downlink packet are allocated using the fixed wireless signal processing time (3 TTIs), and the new downlink packet or downlink packet retransmitted is transmitted to the index position of slot No. 2 of the downlink frame, which is the fourth slot from the index position of slot No. 2 of the (i+1)-th downlink frame which has received the feedback signal. As such, the use of a fixed wireless signal processing time ensures an always fixed transmission performance regardless of the processing capabilities of the base station 100 and the terminal 200.

FIG. 5 is a view showing one example of an HARQ transmission operation of a downlink packet according to an exemplary embodiment of the present invention.

As shown in FIG. 5, the base station 100 resets the wireless signal processing time and transmits a downlink packet to the terminal 200 in a TDD asynchronous HARQ transmission scheme. In the exemplary embodiment of the present invention, the description is made under the assumption that a higher transmission rate is achieved by adjusting the wireless signal processing time to be longer than the reference signal processing time.

If the reference wireless signal processing time is 3 TTIs, the wireless signal processing time in the i-th DL frame is reset to 2 TTIs, and when transmission succeeds, resources for a feedback signal are allocated with respect to a wireless signal processing time of 2 TTIs from the transmission of the next downlink packet.

Concretely, in the case that the terminal 200 has transmitted an ACK signal as the feedback signal from the index position of slot No. 1 of the (i−1)-th uplink frame, the base station 100 resets the wireless signal processing time to 2 TTIs corresponding to a value smaller than 3 TTIs, and transmits an encoded downlink packet and a downlink control signal from the index position of slot No. 3 of the i-th downlink frame to the terminal 200. At this point, the index position of slot No. 2 of the i-th uplink frame after 2 TTIs from the index position of slot No. 3 of the i-th downlink frame is included, as the transmission position of the feedback signal, in the downlink control signal. The terminal 200 detects the presence or absence of an error by decoding the downlink packet. The terminal 200 encodes the feedback signal and transmits it from the index position of slot No. 2 of the i-th uplink frame.

Having received an ACK signal as the feedback signal, the base station 100 recognizes that the processing capability of the terminal 200 is possible even if the wireless signal processing time is set to 2 TTIs.

If it is necessary to retransmit the downlink packet, resources for the transmission of the downlink packet are allocated using the reset wireless signal processing time (2 TTIs). Otherwise, if it is not necessary to retransmit the downlink packet, resources for the transmission of a new downlink packet are allocated using the reset wireless signal processing time (2 TTIs).

In this manner, a data packet can be transmitted and received faster than in the HARQ transmission scheme of a downlink packet as the wireless signal processing time is readjusted.

The exemplary embodiments of the present invention are not implemented only by a device and/or method, but can be implemented through a program for realizing functions corresponding to the configuration of the exemplary embodiments of the present invention and a recording medium having the program recorded thereon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for acquiring a wireless signal processing time of a terminal in a base station, the method comprising:
   sending a request for the wireless signal processing time to the terminal;
   receiving the wireless signal processing time from the terminal;
   determining the transmission position of a feedback signal for a data packet using the wireless signal processing time; and
   transmitting the transmission position of a feedback signal to the terminal.

2. The method of claim 1, wherein the data packet is a downlink packet, and the transmitting comprises:
   transmitting the downlink packet to the terminal; and
   transmitting a downlink control signal, along with the downlink packet, to the terminal,
   the downlink control signal comprises the transmission position of the feedback signal.

3. The method of claim 2, wherein the sending for request comprises periodically sending the request for the wireless signal processing time, and
   the receiving comprises periodically updating the wireless signal processing time.

4. The method of claim 2, further comprising receiving, from the terminal, the feedback signal transmitted at the above transmission position of the feedback signal,
   wherein the feedback signal comprises the success or failure of reception of the downlink packet of the terminal.

5. The method of claim 4, further comprising, if the reception fails, retransmitting the downlink packet to the terminal.

6. The method of claim 1, wherein the data packet is an uplink packet, the determining comprises:
   allocating resources for the uplink packet using the wireless signal processing time; and
   determining the position of a feedback signal for the uplink packet,
   the transmitting comprises:
   transmitting a downlink control signal containing resource allocation information and the transmission position of the feedback signal.

7. The method of claim 6, further comprising:
   receiving the uplink packet transmitted using the resource allocation information from the terminal;
   transmitting the feedback signal at the transmission position of the feedback signal to the terminal,
   wherein the feedback signal comprises the success or failure of reception of the uplink packet.

8. A method for acquiring a wireless signal processing time of a terminal in a base station, the method comprising:
   setting the wireless signal processing time to a first value;
   when transmitting a downlink packet to the terminal, determining the transmission position of a feedback signal of the downlink packet using the first value and transmitting the same to the terminal;
   receiving, from the terminal, the feedback signal for the downlink packet transmitted at the above transmission position;
   resetting the wireless signal processing time to a second value different from the first value; and
   if there is a downlink packet to be transmitted to the terminal, determining the transmission position of the feedback signal using the second value and transmitting the same to the terminal.

9. The method of claim 8, wherein the resetting comprises the wireless signal processing time to the second value by considering the processing capability of the terminal.

10. The method of claim 8, wherein the resetting comprises setting the wireless signal processing time to the second value if the feedback signal indicates the success of reception of the downlink packet, and
    the second value is smaller than the first value.

11. The method of claim 8, wherein the resetting comprise setting the wireless signal processing time to the second value if the feedback signal indicates the failure of reception of the downlink packet, and
    the second value is greater than the first value.

12. The method of claim 8, wherein the resetting comprises setting the wireless signal processing time to the second value by considering the service quality of the downlink packet.

13. A method for acquiring a wireless signal processing of a terminal time in a base station, the method comprising:
    if there is an uplink packet to be transmitted to the base station from the terminal, receiving a resource allocation request message from the terminal;
    allocating resources for the uplink packet using a wireless signal processing time having a first value, determining the transmission position of a feedback signal for the uplink packet, and transmitting the same to the terminal;
    receiving, from the terminal, the uplink packet transmitted using the above resources;
    transmitting the feedback signal at the transmission position to the terminal;
    resetting the wireless signal processing time to a second value different from the first value; and
    if a resource allocation request message is received from the terminal, allocating the resources using the second value and determining the transmission position of the feedback signal and transmitting the same to the terminal.

14. The method of claim 13, wherein the resetting comprises setting the wireless signal processing time to the second value by considering the processing capability of the terminal.

15. The method of claim 13, wherein the resetting comprises setting the wireless signal processing time to the second value if the feedback signal indicates the success of reception of the uplink packet, and
    the second value is smaller than the first value.

16. The method of claim 13, wherein the resetting comprise setting the wireless signal processing time to the second value if the feedback signal indicates the failure of reception of the uplink packet, and
    the second value is greater than the first value.

17. The method of claim 13, wherein the resetting comprises setting the wireless signal processing time to the second value by considering the service quality of the uplink packet.

* * * * *